United States Patent
Hamilton, II et al.

(10) Patent No.: US 10,929,602 B2
(45) Date of Patent: Feb. 23, 2021

(54) TRAINING OF COGNITIVE SYSTEMS

(71) Applicant: INTERNATIONAL BUSINESS MACHINES CORPORATION, Armonk, NY (US)

(72) Inventors: Rick A. Hamilton, II, Charlottesville, VA (US); James S. Luke, Cowes (GB); Philip D. Tetlow, Cleveland (GB); Ralph P. Williams, Danville, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 152 days.

(21) Appl. No.: 16/055,281

(22) Filed: Aug. 6, 2018

(65) Prior Publication Data
US 2020/0042827 A1 Feb. 6, 2020

(51) Int. Cl.
| | |
|---|---|
| *G06F 40/247* | (2020.01) |
| *G06K 9/62* | (2006.01) |
| *G06N 20/00* | (2019.01) |
| *G06F 16/35* | (2019.01) |
| *G06F 16/335* | (2019.01) |
| *G06F 40/253* | (2020.01) |

(52) U.S. Cl.
CPC .......... *G06F 40/247* (2020.01); *G06F 16/335* (2019.01); *G06F 16/35* (2019.01); *G06F 40/253* (2020.01); *G06K 9/6257* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 4,864,502 A | * | 9/1989 | Kucera | G06F 40/253 704/8 |
| 9,378,204 B2 | | 6/2016 | Mueller et al. | |
| 2002/0022955 A1 | * | 2/2002 | Troyanova | G06F 40/211 704/9 |
| 2007/0288448 A1 | * | 12/2007 | Datta | G06F 16/3338 |
| 2007/0299824 A1 | * | 12/2007 | Pan | G06F 16/3329 |
| 2014/0180677 A1 | * | 6/2014 | McCaffrey | G06F 16/3329 704/9 |
| 2014/0222743 A1 | * | 8/2014 | Baughman | G06F 40/205 706/46 |

(Continued)

OTHER PUBLICATIONS

Mell, et al., "The NIST Definition of Cloud Computing," National Institute of Standards and Technology, U.S. Department of Commerce, Special Publication 800-145, Sep. 2011, pp. 1-7.

(Continued)

*Primary Examiner* — Douglas Godbold
(74) *Attorney, Agent, or Firm* — Kenneth Han

(57) ABSTRACT

A computer-implemented method, apparatus and computer program product of question generation in a cognitive system, comprising: receiving a training question; applying rules of grammar and common usage to generate variants of the training question; identifying any generalized versions of specific words, such as verbs or nouns in the training question; identifying any questions related to the training question; filtering out, utilizing a classifier, generated variants which do not make sense; and providing one or more output questions, synonymous to the training question.

18 Claims, 7 Drawing Sheets

(56) References Cited

U.S. PATENT DOCUMENTS

| | | | | |
|---|---|---|---|---|
| 2015/0178623 | A1 | 6/2015 | Balani et al. | |
| 2015/0179082 | A1 | 6/2015 | Byron et al. | |
| 2016/0019812 | A1* | 1/2016 | Barkan | G09B 7/00 434/322 |
| 2016/0180242 | A1* | 6/2016 | Byron | G06N 20/00 706/11 |
| 2016/0350406 | A1* | 12/2016 | Byron | G06F 40/247 |
| 2017/0075985 | A1* | 3/2017 | Chakraborty | G06F 16/3329 |
| 2018/0011838 | A1* | 1/2018 | Beller | G06F 40/247 |
| 2018/0075366 | A1* | 3/2018 | Dole | G06F 16/3344 |
| 2019/0121608 | A1* | 4/2019 | Dolph | G06F 3/167 |

OTHER PUBLICATIONS

Power, "Artificial Intelligence Is Almost Ready for Business", Harvard Business Review, Technology, https://hbr.org/2015/03/artificial-intelligence-is-almost-ready-for-business, Mar. 19, 2015, pp. 1-7.

University of Toronto, "Artificial Neural Networks Technology", Department of Psychology, http://www.psych.utoronto.ca/users/reingold/courses/ai/cache/neural3.html, accessed Jul. 13, 2018, pp. 1-5.

Baldwin, "Two ways to train artificial intelligence—and do crosswords with ease", Science Node, https://sciencenode.org/feature/how-to-train-your-artificial-intelligence-and-do-crosswords-with-ease.php, May 25, 2016, pp. 1-5.

MIT Technology Review, "Google DeepMind Teaches Artificial Intelligence Machines to Read", https://www.technologyreview.com/s/538616/google-deepmind-teaches-artificial-intelligence-machines-to-read/, Jun. 17, 2015, pp. 1-5.

Tanz, "Soon We Won't Program Computers. We'll Train Them Like Dogs", Wired, https://www.wired.com/2016/05/the-end-of-code/, May 17, 2016, pp. 1-9.

O'Brien, "Sentence Structure", https://www.english-grammar-revolution.com/sentence-structure.html, Accessed Jul. 13, 2018, pp. 1-6.

dictionary.com, "Synonyms and Antonyms of Words at Thesaurus.com", http://www.thesaurus.com/, accessed Jul. 13, 2018, pp. 1-6.

University of Central Florida, "SenDraw", UCF: CAH: English: SenDraw, http://sendraw.ucf.edu/, accessed Jul. 13, 2018, 1 page.

1AIWAY, "Sentence Diagrammer", http://1aiway.com/nlp4net/services/enparser/, accessed Jul. 13, 2018, 1 page.

Informer Technologies, Inc., "Diagramming Sentences", Software. Informer, http://diagramming-sentences.software.informer.com/, accessed Jul. 13, 2018, pp. 1-4.

English Plus, "Gone or Went?", http://englishplus.com/grammar/00000217.html, accessed Jul. 13, 2018, 1 page.

Wikipedia, "Word stemInclusionoftheseirregulars", https://en.wikipedia.org/wiki/Word_stem, accessed Jul. 13, 2018, 3 pages.

Singh et al., "Question Independent Grading using Machine Learning: The Case of Computer Program Grading", KDD '16, Aug. 13-17, 2016, San Francisco, CA, USA, pp. 1-10.

Anonymous, "System and Method for Refined (Cognitive) Sets of Questions and Answers", An IP.com Prior Art Database Technical Disclosure, IP.com No. IPCOM000247474D, IP.com Electronic Publication Date: Sep. 9, 2016, pp. 1-5.

* cited by examiner

TRAINING OF COGNITIVE SYSTEMS

BACKGROUND

The present invention relates to training of cognitive systems, and more specifically to computer-implemented methods of question generation so as to speed up the training of cognitive systems.

A strength of cognitive systems is that they learn from experience, but this also means that they require a considerable amount of time initially, to "train" the relevant software components of the cognitive system. This is especially evident in cognitive systems targeted at question-and-answer type models. In such cases, standard training practice suggests that questions must be human generated, a task that can be particularly lengthy.

When "training" cognitive question-and-answer systems, it is necessary to compose sample questions from which the system can learn. These questions are then classified and "answered" by the system, and the trainer corrects the classifications appropriately to optimize the performance of the system. This cycle continues until the system performs to its design requirements. However, one of the characteristics of natural language is that people may ask essentially the same, or a very similar, question in many different ways.

For example, when training a cognitive customer help desk tool for a city government, the help desk tool might need to be trained to answer a question such as "How do I obtain a dog license?" from a document in its corpus, that is, the set of data with which it works. That document in native form might say something like, "To obtain a dog license, apply in person at the City Office at 123 Church Road, Smartville between 9 am and 5 pm; or by mail at PO Box 456, Smartville City Office, 123 Church Road, Smartville; or on line using form ABC available from www.smartville.gov/dog license." However, the tool will also need to know, and hence, be trained to recognize, that the following questions are either directly equivalent to "How do I obtain a dog license?", or very close to it, and therefore require, fundamentally, the same answer:

"How do I order a dog license?"
"How do I license my dog?"
"Where do I get a dog license?"
'Where do I get a license for a German Shepherd?"
"Where can I buy a canine license?"
"Can I buy a dog license on-line?"
"Who can give me a dog license?"
"What form do I need for a dog license?"

Generating different forms of the same question or recognizing that two questions are equivalent and therefore need to be keyed to the same piece of data is time-consuming. It is also surprisingly exacting, because while a missed different form can usually be picked up by the cognitive system over time, it can significantly reduce the effectiveness of the system when the public first starts to use it.

SUMMARY

According to an embodiment of the invention, a computer-implemented method of question generation in a cognitive system, comprising: receiving a training question; applying rules of grammar and common usage to generate variants of the training question; identifying any generalized versions of specific words, such as verbs or nouns in the training question; identifying any questions related to the training question; filtering out, utilizing a classifier, generated variants which do not make sense; and providing one or more output questions, synonymous to the training question. Embodiments of the present invention provide the advantage of recognizing that two or more questions are equivalent or generating different forms of the same question, thus saving a time consuming manual process.

In a preferred embodiment, the computer-implemented method further comprises refining and amending the applying rules of grammar and common usage. This has the advantage of identifying a missed different form of the same question thus improving the effectiveness of the preferred embodiment when in use.

In a preferred embodiment, the computer-implemented method, prior to the classifier achieving a minimum acceptable performance, the classifier refers the variants of the training question to a user. This has the advantage of improving the initial performance of the computer-implemented method.

Embodiments of the invention provide apparatus for question generation in a cognitive system, comprising: an algorithmic component which receives a training question and applies rules of grammar and common usage to generate variants of said training question; a cognitive component which identifies any generalized versions of specific words, such as verbs or nouns and identifies any questions related to said training question; and a filtering component comprising a classifier which filters out generated variants which do not make sense, the filtering component providing one or more output questions, synonymous to said training question.

Embodiments of the invention also provide a computer program product for question generation in a cognitive system, the computer program product comprising: a computer readable storage medium having program instructions embodied therewith, the program instructions executable by a computer to cause the computer to: receive a training question; apply rules of grammar and common usage to generate variants of said training question; identify any generalized versions of specific words, such as verbs or nouns in said training question; identify any questions related to said training question; filtering out, utilizing a classifier, generated variants which do not make sense; and provide one or more output questions, synonymous to said training question.

BRIEF DESCRIPTION OF THE DRAWINGS

Preferred embodiments of the present invention will now be described in more detail, by way of example only, with reference to the accompanying drawings, in which.

DETAILED DESCRIPTION

Figure 1:
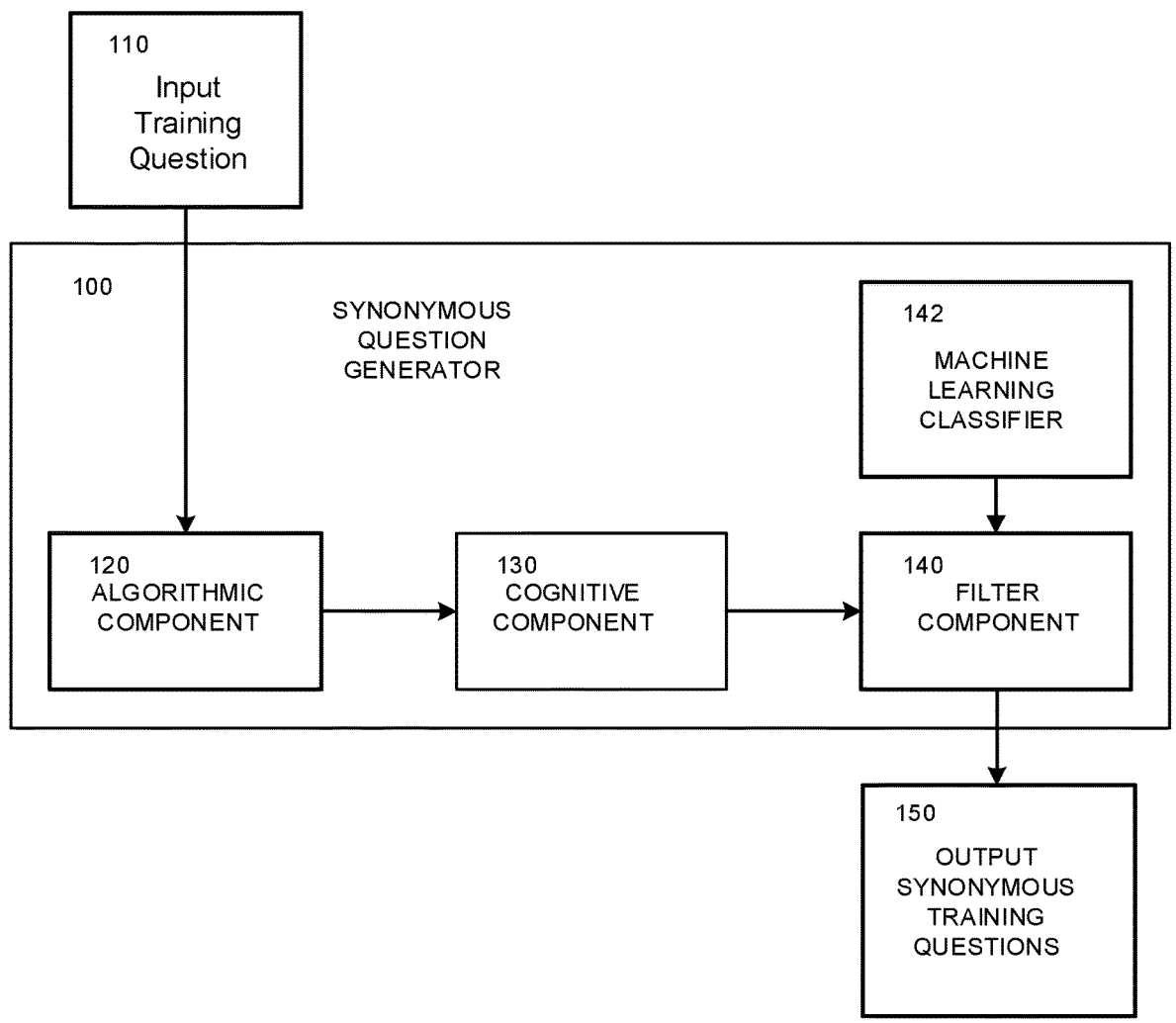
FIG. 1 is a block diagram of an embodiment of a system of question generation in a cognitive system according to the present invention.

FIG. 1 shows a synonymous question generator 100 which receives an input training question 110 and produces one or more output synonymous training questions 150. The output synonymous training questions 150 are utilized for training a cognitive tool. Synonymous question generator 100 comprises an algorithmic component 120, a cognitive component 130 and a filter component 140 together with its associated machine learning classifier 142. The operation of algorithmic component 120 will be explained below with reference to FIG. 2. The operation of cognitive component 130 will be explained below with reference to FIG. 3. The operation of filter component 140 and its associated machine learning classifier 142 will be explained below with reference to FIG. 4.

Algorithmic component 120 applies standard rules of grammar and common usage to generate variants of the input training question 110 to use as output synonymous training questions 150. Using an example of questions concerning dog licenses, some examples of applying standard rules of grammar and common usage will be described below. The examples described below are exemplary only and there are numerous other standard rules which may be identified and used. Algorithmic component 120 may apply one rule or more than one rule, without limitation as to the number of rules applied. The rules may be applied in any order.

Figure 2:
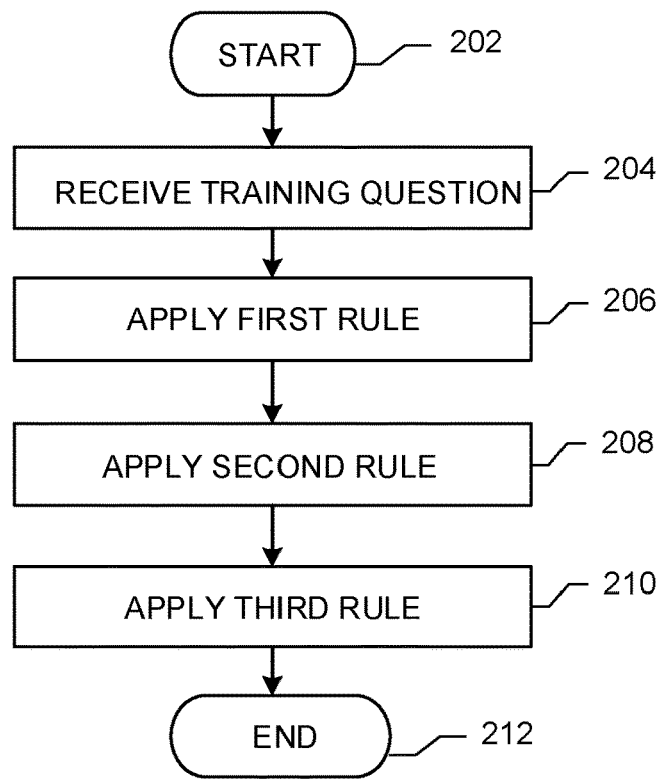
FIG. 2 is a flow chart of the algorithmic application of standard rules of grammar and common usage to an input question to generate variants.

Referring to FIG. 2, an embodiment of a computer-implemented method of applying standard rules of grammar and common usage to generate variants of an input training question 110 to use as output synonymous training questions 150 starts at step 202.

At step 204, an input training question 110 is received. At step 206, a first rule is applied. As an example, context specific synonyms for key verbs, such as "obtain", "get", "order" and the like and key nouns such as "dog", "canine" and the like may be applied. Using the example of the key noun of "dog", examples of synonyms may be found in a thesaurus, such as, for example, the online thesaurus found at www.thesaurus.com/browse/dog. Such synonyms may include "canine", "pup", "puppy", "cur", "doggy", "hound", "mutt", "pooch", "stray", "tyke", "bowwow", "fido", "flea bag", "man's best friend" and "tail-wagger". In an embodiment, large bodies of text may be searched to establish term frequencies so as to understand whether a synonym is in common use. For example, such a search may determine that only the synonyms "pup", "puppy" and "hound" are commonly used synonyms.

At step 208, a second rule is applied. As an example, the terms "what", "how", "when", "why", "who" may be applied to the input training question 110. This is achieved by taking the input training question 110 of "how do I get a dog license?" and attempting to generate variants using the other terms listed. For example, applying the term "what" may generate a variant of "what do I [have to do to] get a dog license?" and applying the term "who" may generate a variant of "who do I contact to get a dog license?".

At step 210, a third rule is applied. As an example, adjective/noun pairs in the input training question 110 may be reversed so as to generate a variant. For example, the adjective/noun pair of "dog license" may be reversed to produce a variant of "license [for a] dog". The method ends at step 212.

As mentioned above with reference to FIG. 1, algorithmic component 120 may apply one rule or more than one rule, without limitation as to the number of rules applied. The rules may be applied in any order. Other examples of rules that may be applied include the construction of alternative structures for the questions, for example, based upon rearrangement of clauses within a sentence. For example, a compound sentence contains at least two independent clauses joined by a coordinating conjunction, that is, for, and, nor, but, or, yet or so, or a semicolon. An example of such a compound sentence is:

I went to the City Office to obtain a dog license, but it was closed.

As another example, a complex sentence contains a subordinate clause and an independent clause joined by a subordinating conjunction, such as, for example, after, even or since at the beginning of a complex sentence or so, but or and after a comma separating the independent clause and the subordinate clause. Both the subordinate clause and the independent clause contain a subject and a verb, but only the independent clause expresses a complete thought. The subordinate clause does not make any sense when written alone. Subordinate clauses may be adjective clauses, adverb clauses or noun clauses depending on which portion of the independent clause they are acting on. An example of such a compound sentence is:

After the City Office closes at 5 pm, where can I buy a dog license?

Other examples, such as compound-complex sentences are possible, which contain at least two independent clauses and at least one subordinate clause. More information on sentence structure and diagramming sentences may be found at www.english-grammar-revolution.com/sentence-structure.html.

Constructing these alternative structures is a common activity known to students, and it can now be accomplished by software applications such as "SenDraw" found at sendraw.ucf.edu, "Sentence Diagrammer" found at 1aiway.com/nlp4net/services/enparser/and "Diagramming sentences", found at diagramming-sentences.software.informer.com. Once a sentence is diagrammed, alternative structures can be created in an automated fashion.

Referring back to FIG. 1, cognitive component 130 applies one or more of the following three operations to input training questions 110 so as to generate variants. Using an example of questions concerning dog licenses, some examples of operations will be described below. The operations may be applied in any order.

Figure 3:
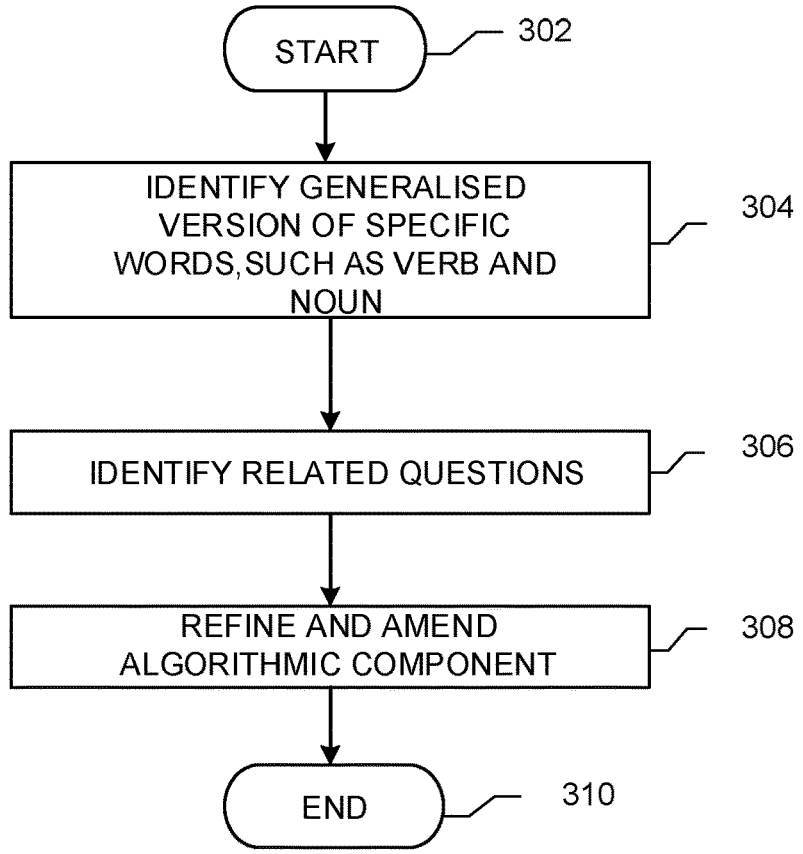
FIG. 3 is a flow chart of the application of cognitive rules to the variants of FIG. 2.

Referring to FIG. 3, an embodiment of a computer-implemented method of applying operations to generate variants of the input training question 110 to use as output synonymous training questions 150 starts at step 302.

At step 304, particular examples of specific words such as verbs or nouns that can be subsumed under a more generalized version of the verb or noun are identified in the input training question 110. For example, the particular example noun "German Shepherd" may be subsumed under the more general noun "dog".

Also at step 304, application of stemming and irregular verbs may be accomplished. The English language contains numerous irregular verbs, but sources of matching these verbs are available. For example, "gone", the past participle of "to go", and "went", the past tense of "to go" mean virtually the same thing, and can thus be interchanged in many scenarios. Additionally, stemming terms may be included to establish functional equivalency. For example, a virtual equivalence may exist between "wait," "waits," and "waiting." Inclusion of these irregular verbs, along with application of stems provides a complete set of interchangeable terms.

At step 306, any questions related to the training question are identified, that is, related questions that point to the same text passage ("when is the dog license office open?"), or to some other, related text passage (for example, "how much is a dog license?" or "what documents do I need to obtain a license for my German Shepherd?") are identified.

While embodiments of the present invention may initially be more suited to use cases involving "general" use of language, for example, communication with the general public, rather than in professional domains such as medicine, where specialized vocabularies might apply, the cognitive component 130 may allow embodiments of the present invention to learn such vocabularies and so support the development of cognitive applications for these domains.

At step 308, the algorithmic component refines and amends the applying rules of grammar and common usage over time. The method ends at step 310. As mentioned above with reference to FIG. 1, the operations may be applied in any order.

Referring back to FIG. 1, filter component 140 improves the quality of the generated variants by filtering out variants that do not make sense. Consider the real world statement:

I'd like to take my dog to the vet.

The combination of the algorithmic component 120 and the cognitive component 130 may produce a wide range of variants, such as, for example:

I'd like to take my dog to the kennel.
I'd like to take my dog to the beach.
I'd like to take my dog to the obedience class.

With a bit more sophistication, the combination of the algorithmic component 120 and the cognitive component 130 could produce the following example:

I'd like to take my dog for a walk.

However, the combination of the algorithmic component 120 and the cognitive component 130 could also then start generating statements such as:

I'd like to take my cat to the kennel.
I'd like to take my cat for a walk.

Filter component 140 takes the generated variants and applies a Machine Learning Classifier 142 to discriminate between a good training variant and a bad training variant. In this way filter component 140 removes variants that do not make sense or should not be included in a final set of output synonymous training questions 150.

Figure 4:
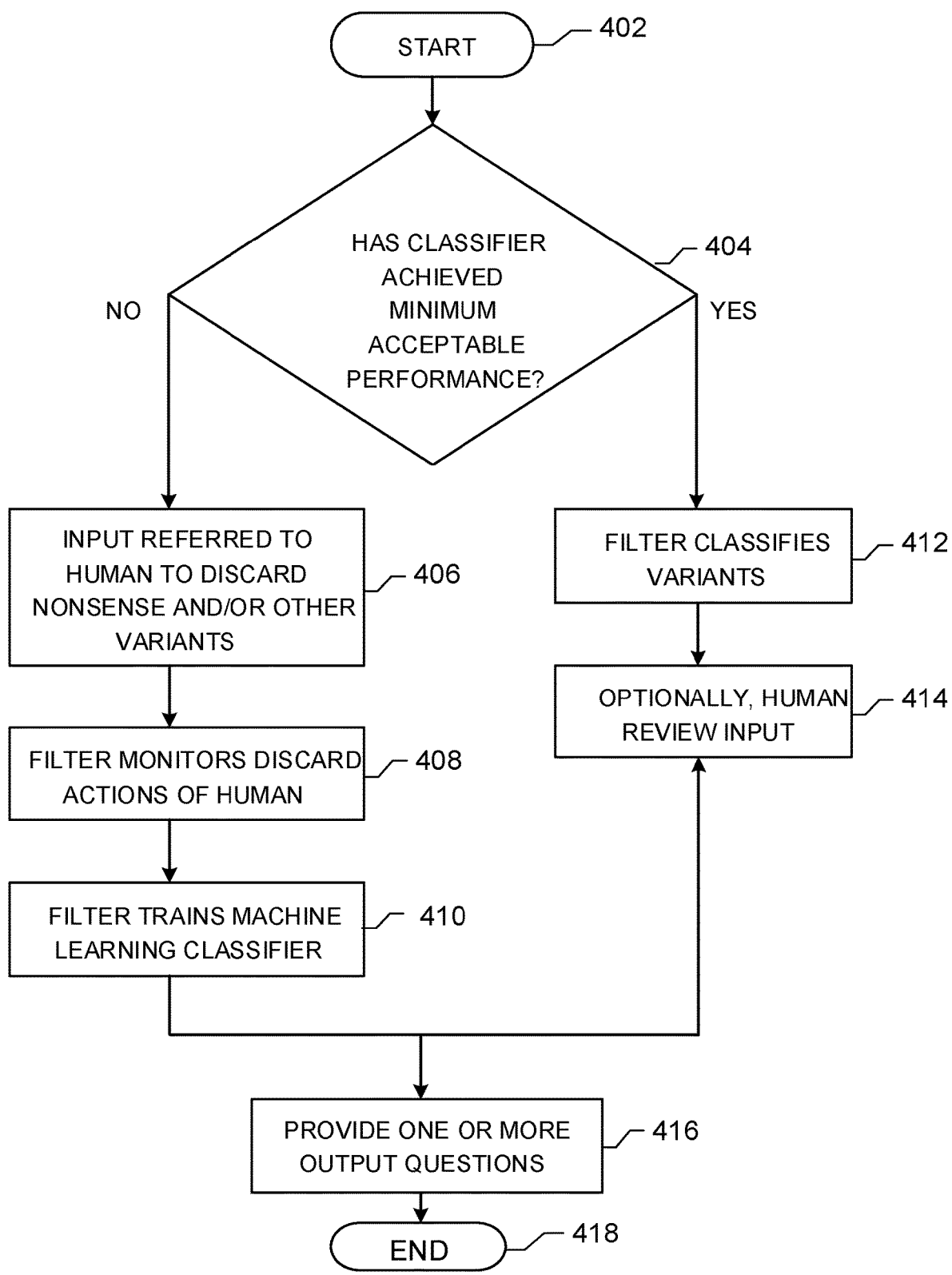
FIG. 4 is a flow chart of the application of filtering to variants resulting from the application of the cognitive rules of FIG. 3.

Referring to FIG. 4, which is an embodiment of a computer-implemented method of filtering out, utilizing a classifier, generated variants which do not make sense so as to improve the quality of the generated variants. The method starts at step 402. At step 404, a check is made as to whether the Machine Learning Classifier has achieved a minimum acceptable level of performance, such as, for example, being correct 80% of the time. In an initial state and until the minimum acceptable level of performance has been achieved, processing continues to step 406. At step 406, in an initial state, all input variants generated by the algorithmic component 120 and the cognitive component 130 are presented to a user who analyzes them and discards garbage or inappropriate phrases. At step 408, the filter component 140 operates in the background monitoring the actions of the user. At step 410, the filter component continually trains the Machine Learning Classifier 142 based on the variants that are either discarded or accepted by the user. The Machine Learning Classifier 142 is trained using the applying rules, the identifying any generalized versions and the identifying any questions related to the training question, based on the variants of the training question which are accepted by the user.

Over time, the Machine Learning Classifier 142 becomes more and more effective at learning which automatically generated phrases are good and which are garbage. As soon as the Machine Learning Classifier 142 within the filter component 140 has been trained for the first time, the filter component 140 starts comparing the decisions of the Machine Learning Classifier 142 with the decisions of the user and trains the classifier. At step 416, one or more output questions 150 are provided, synonymous to the input training question 110. The processing of the input variant ends at step 418.

Returning to step 404 and after a period of time the Machine Learning Classifier 142 will have achieved a minimum acceptable performance, for example, it is correct 80% of the time. Responsive to the Machine Learning Classifier 142 achieving a minimum acceptable performance, the check made at step 404 determines this and processing passes to step 412 instead of step 406. At step 412, the filter component 140 starts automatically classifying variants and filtering out generated variants from the training set. At step 414, the user may optionally still be presented with a subset of the generated variants so that the filter component 140 can may continue to monitor its own accuracy and may improve the accuracy of the selection of the generated variants. This is achieved by the classifier referring the variants of the training question to a user.

As the synonymous question generator 100 learns, the amount of user input required decreases. At step 416, one or more output questions 150 are provided, synonymous to the input training question 110. The processing of the input variant ends at step 418.

The synonymous question generator 100 may function through an Application Program Interface (API). In some embodiments the synonymous question generator 100 may be activated via an on-screen icon that the user training the cognitive system clicks on. In other embodiments, the synonymous question generator 100 may be a stand-alone system. The synonymous question generator 100 would then generate different forms which a user would then select, or amend slightly and then select, for entry into whatever tool was being used for the training.

The synonymous question generator 100 needs to be re-cast for each new language with which it is used, such as for example, English, French, German, Mandarin or the like. However, embodiments of the invention provide adaptive techniques to more quickly train artificial intelligence. In summary, the synonymous question generator 100 builds a library of functionally equivalent terms including synonyms, differing sentence structures, and functionally equivalent terms. These library of possible question structures allow the cognitive system to be trained faster and more efficiently than it has in the past, thus increasing the attractiveness of cognitive systems.

Figure 5:
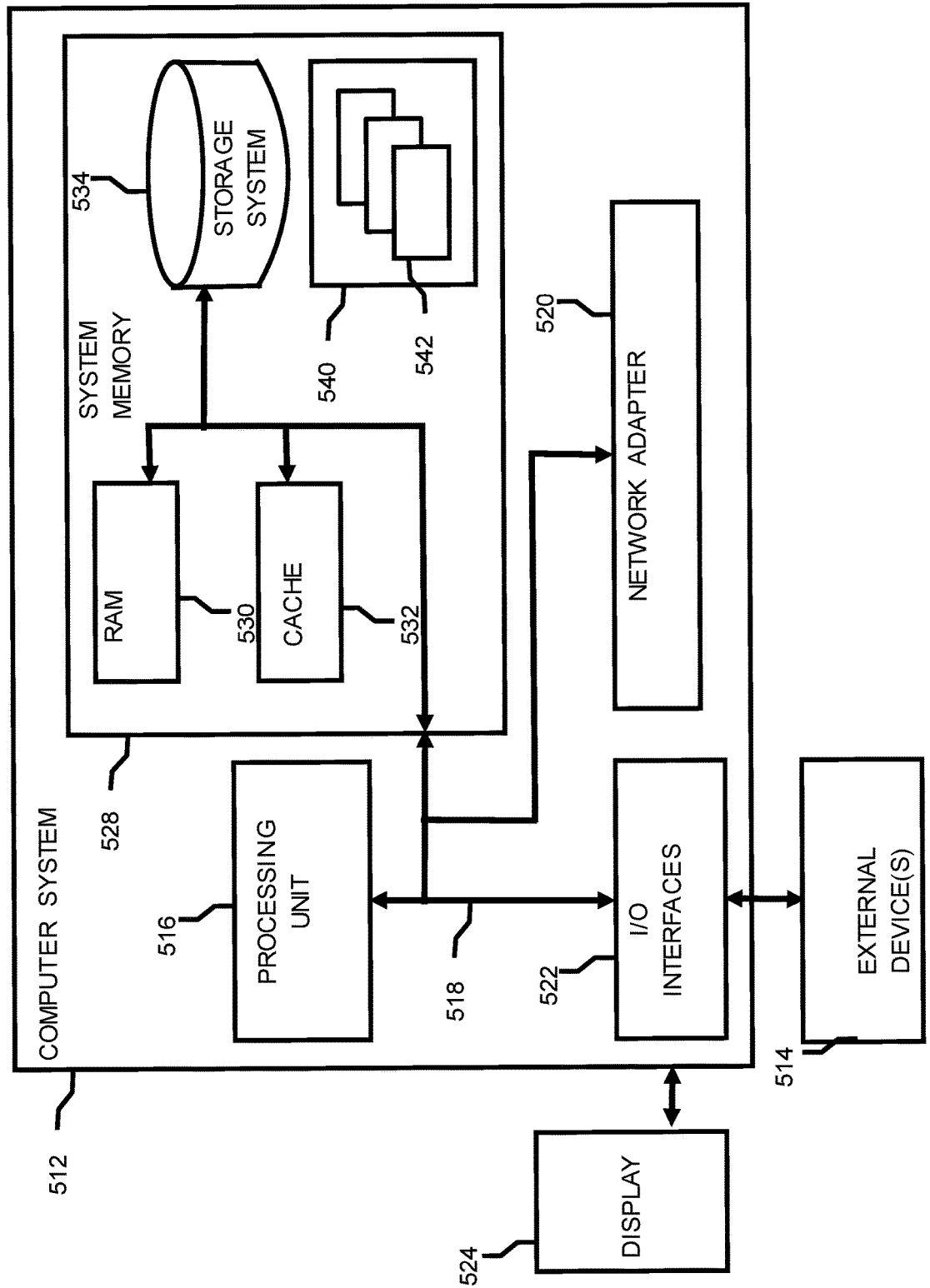
FIG. 5 depicts a computer system according to an embodiment of the present invention.

Referring now to FIG. 5, a schematic of an example of computing system is shown. Computing system 512 is only one example of a suitable computing system and is not intended to suggest any limitation as to the scope of use or functionality of embodiments of the invention described herein. Regardless, computing system 512 is capable of being implemented and/or performing any of the functionality set forth hereinabove.

Computer system/server 512 is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
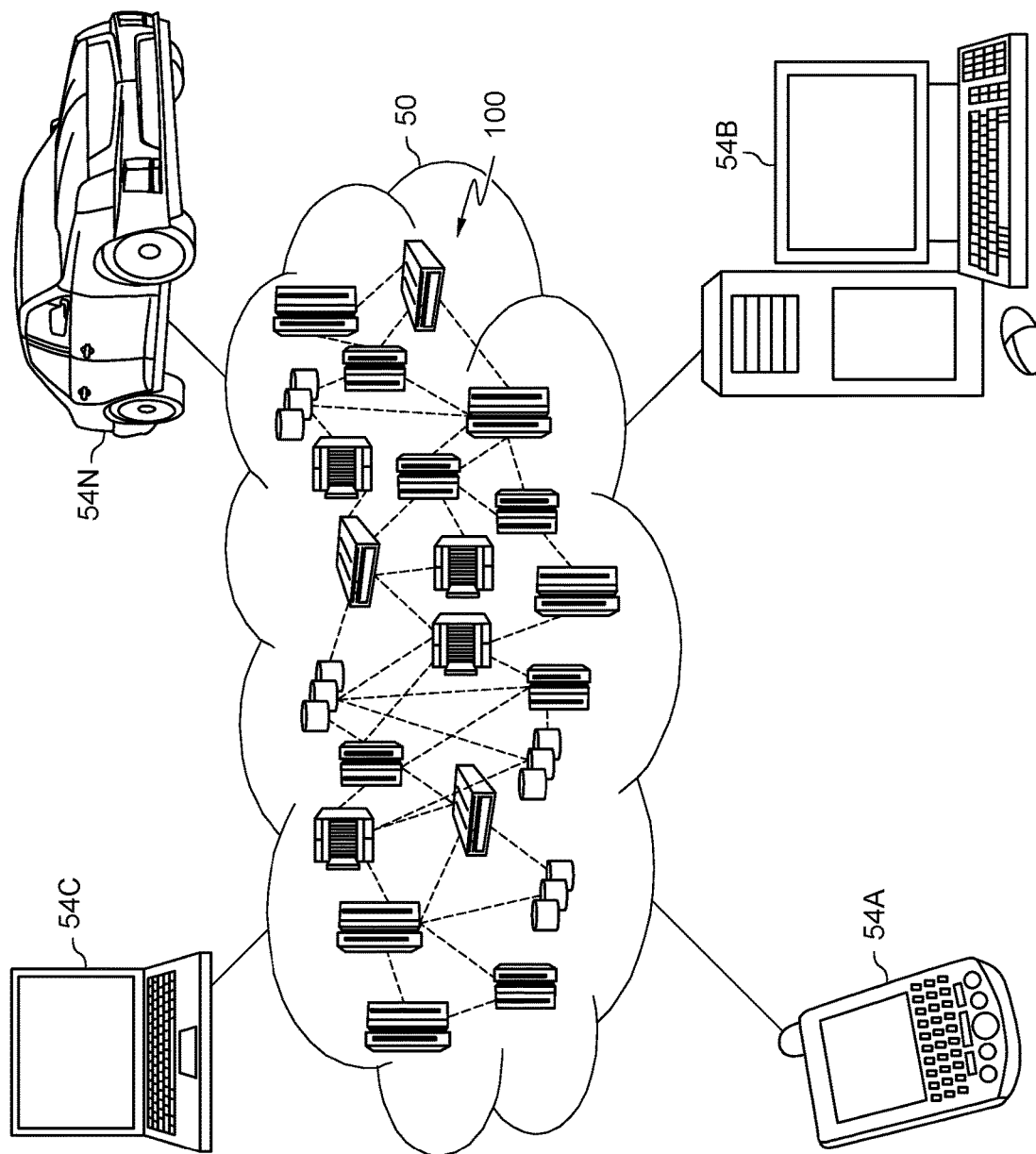
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer MB, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
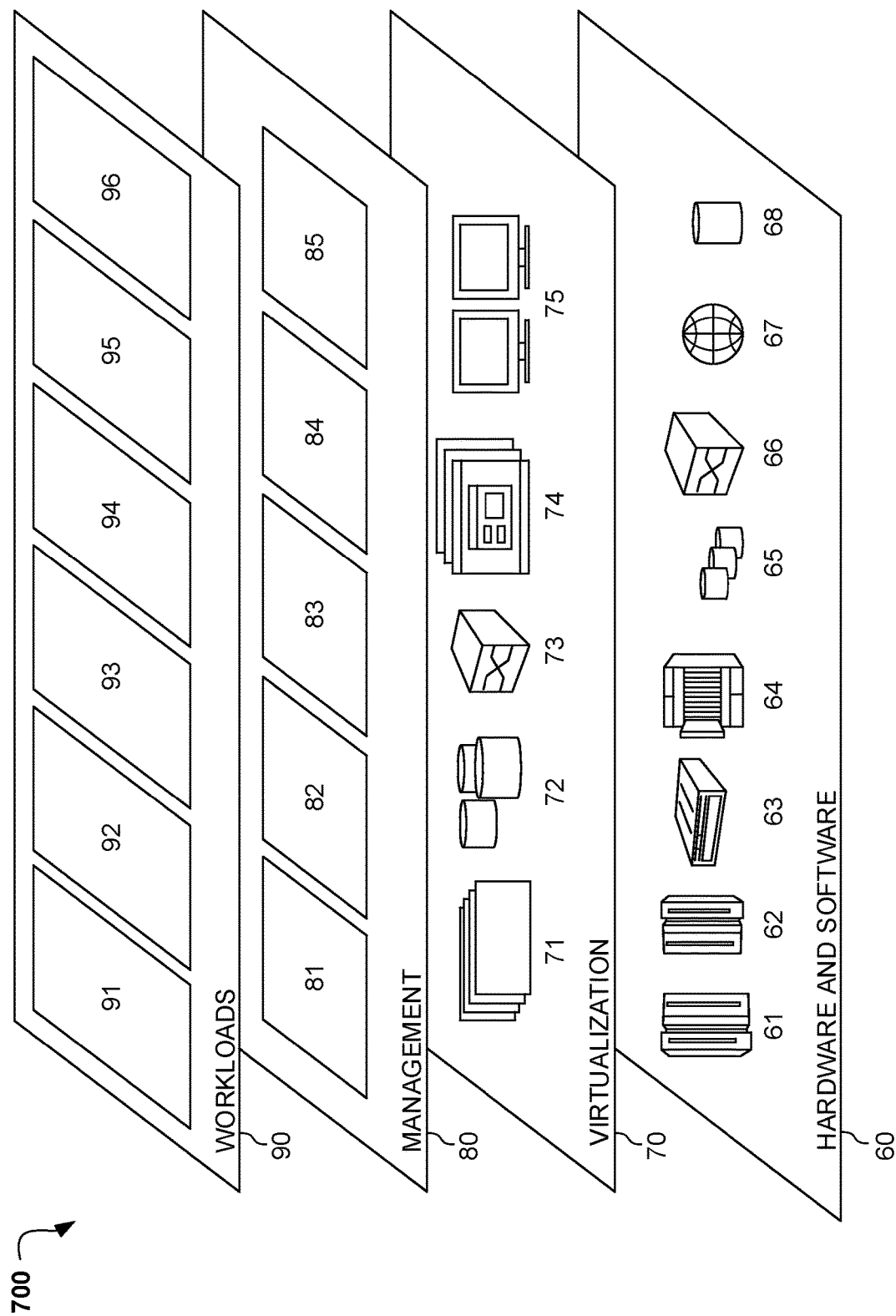
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfilment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive systems training 96. Cognitive systems training 96 may relate to generating cognitive systems training questions and variants of the questions which further are analysed and filtered to remove the output questions that do not make sense.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of question generation in a cognitive system, comprising:
   receiving a training question;
   applying standard rules of grammar and common usage to generate variants of the training question;
   identifying any generalized versions of specific words in the training question;
   identifying any questions related to the training question;
   filtering out, utilizing a machine learning classifier, the generated variants which do not make sense because the generated variant is a subordinate clause without an independent clause until the classifier is trained to achieve a minimum acceptable performance; and
   providing one or more output questions, synonymous to the training question.

2. The computer-implemented method of claim 1, further comprising refining and amending the applied rules of grammar and common usage.

3. The computer-implemented method of claim 1, wherein prior to the classifier achieving the minimum acceptable performance, the classifier refers the generated variants of the training question to a user.

4. The computer-implemented method of claim 3, wherein the applied rules, the generalized versions of the specific words and the identified questions related to the training question are used to train the classifier based on the generated variants of the training question which are accepted by a user.

5. The computer-implemented method of claim 3, further comprising:
   comparing a decision of the classifier with a decision of a user and training the classifier; and
   in response to the classifier achieving the minimum acceptable performance, the filtering starts automatically classifying variants and filtering out the generated variants.

6. The computer-implemented method of claim 1, further comprising presenting a user with a subset of the generated variants so as to improve the accuracy of the selection of the generated variants.

7. Apparatus for question generation in a cognitive system, comprising:
   an algorithmic component which receives a training question and applies standard rules of grammar and common usage to generate variants of the training question;
   a cognitive component which identifies any generalized versions of specific words and identifies any questions related to the training question; and
   a filtering component comprising a machine learning classifier which filters out generated variants which do not make sense because the generated variant is a subordinate clause without an independent clause until the classifier is trained to achieve a minimum acceptable performance, the filtering component providing one or more output questions, synonymous to the training question.

8. The apparatus of claim 7, wherein said algorithmic component refines and amends the applied rules of grammar and common usage.

9. The apparatus of claim 7, wherein prior to the classifier achieving the minimum acceptable performance, the filtering component refers the generated variants of the training question to a user.

10. The apparatus of claim 9, wherein the classifier is trained using the applied rules in the algorithmic component, the generalized versions of specific words in the cognitive component and the identified questions related to the training question in the cognitive component based on the variants of the training question which are accepted by a user.

11. The apparatus of claim 9, wherein the filtering component:
    compares a decision of the classifier with a decision of a user and training the classifier; and
    in response to the classifier achieving the minimum acceptable performance, the filtering component starts automatically classifying variants and filtering out the generated variants.

12. The apparatus of claim 7, wherein the filtering component presents a user with a subset of the variants so as to improve the accuracy of the selection of the variants.

13. A computer program product for question generation in a cognitive system, the computer program product comprising:
    a computer readable storage medium having program instructions embodied therewith, the program instructions executable by a computer to cause the computer to:
    receive a training question;
    apply standard rules of grammar and common usage to generate variants of the training question;
    identify any generalized versions of specific words in the training question;
    identify any questions related to the training question;
    filtering out, utilizing a machine learning classifier, generated variants which do not make sense because the generated variant is a prepositional phrase that is not associated with an object of the generated variant until the classifier is trained to achieve a minimum acceptable performance; and
    provide one or more output questions, synonymous to the training question.

14. The computer program product of claim 13, further comprising refining and amending the applied rules of grammar and common usage.

15. The computer program product of claim 13, wherein prior to the classifier achieving the minimum acceptable performance, the classifier refers the generated variants of the training question to a user.

16. The computer program product of claim 15, wherein the applied rules, the generalized versions of specific words and the identified questions related to the training question are used to train the classifier based on the generated variants of the training question which are accepted by a user.

17. The computer program product of claim 15, further comprising:
- comparing a decision of the classifier with a decision of a user and training the classifier; and
- in response to the classifier achieving the minimum acceptable performance, the filtering starts automatically classifying the variants and filtering out the generated variants.

18. The computer program product of claim 13, further comprising presenting a user with a subset of the generated variants so as to improve the accuracy of the selection of the generated variants.

* * * * *